Patented May 8, 1951

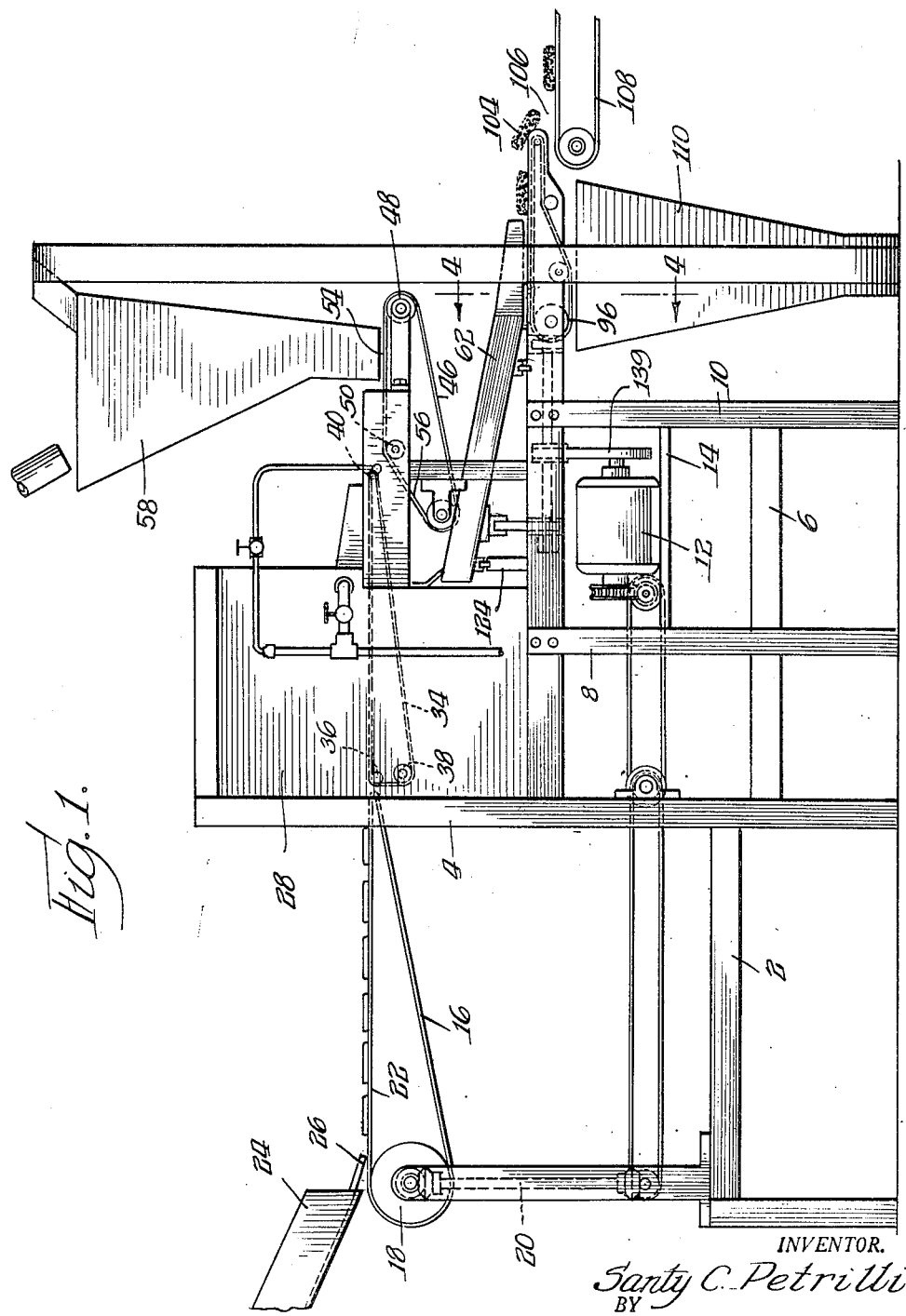

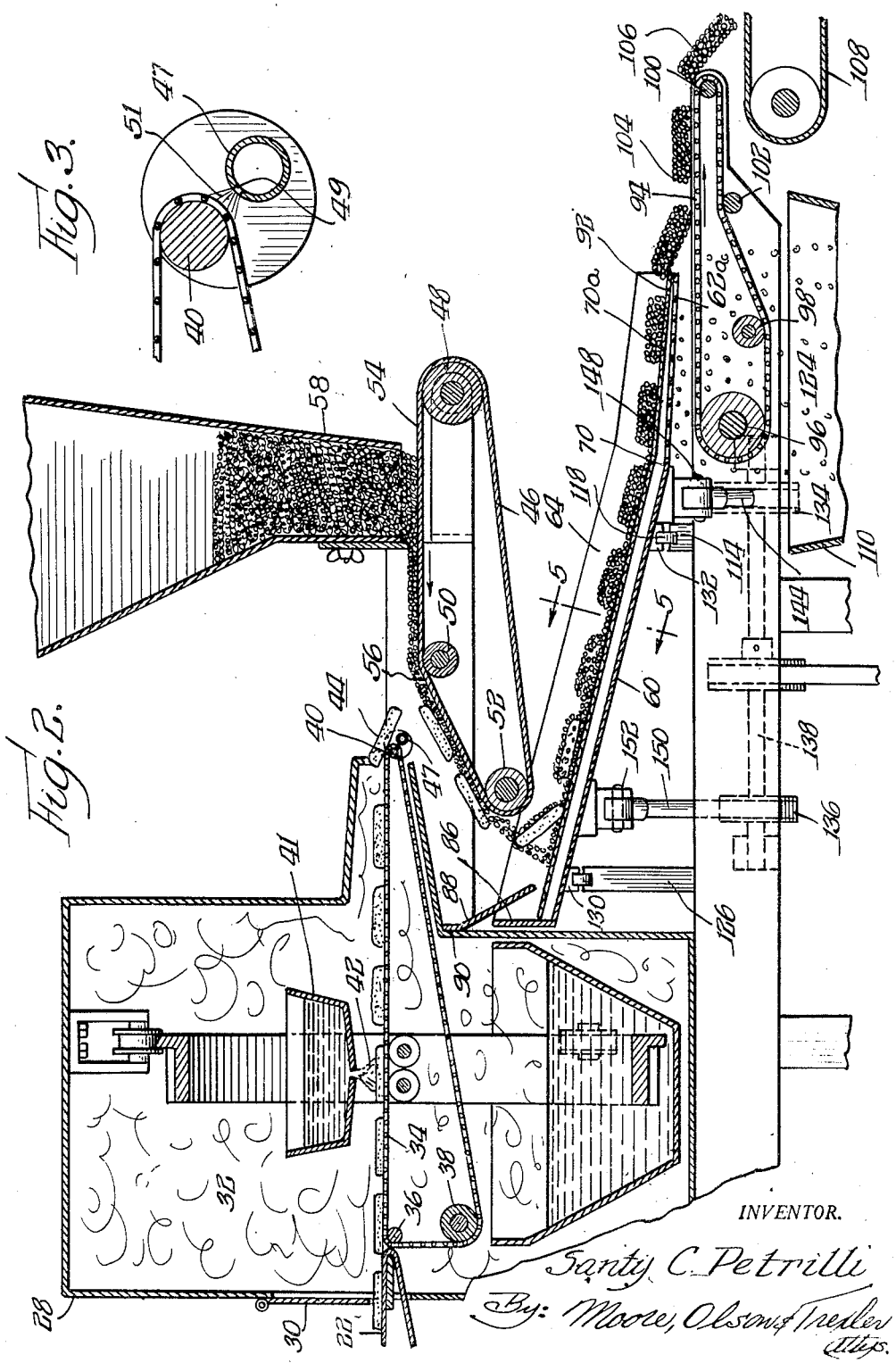

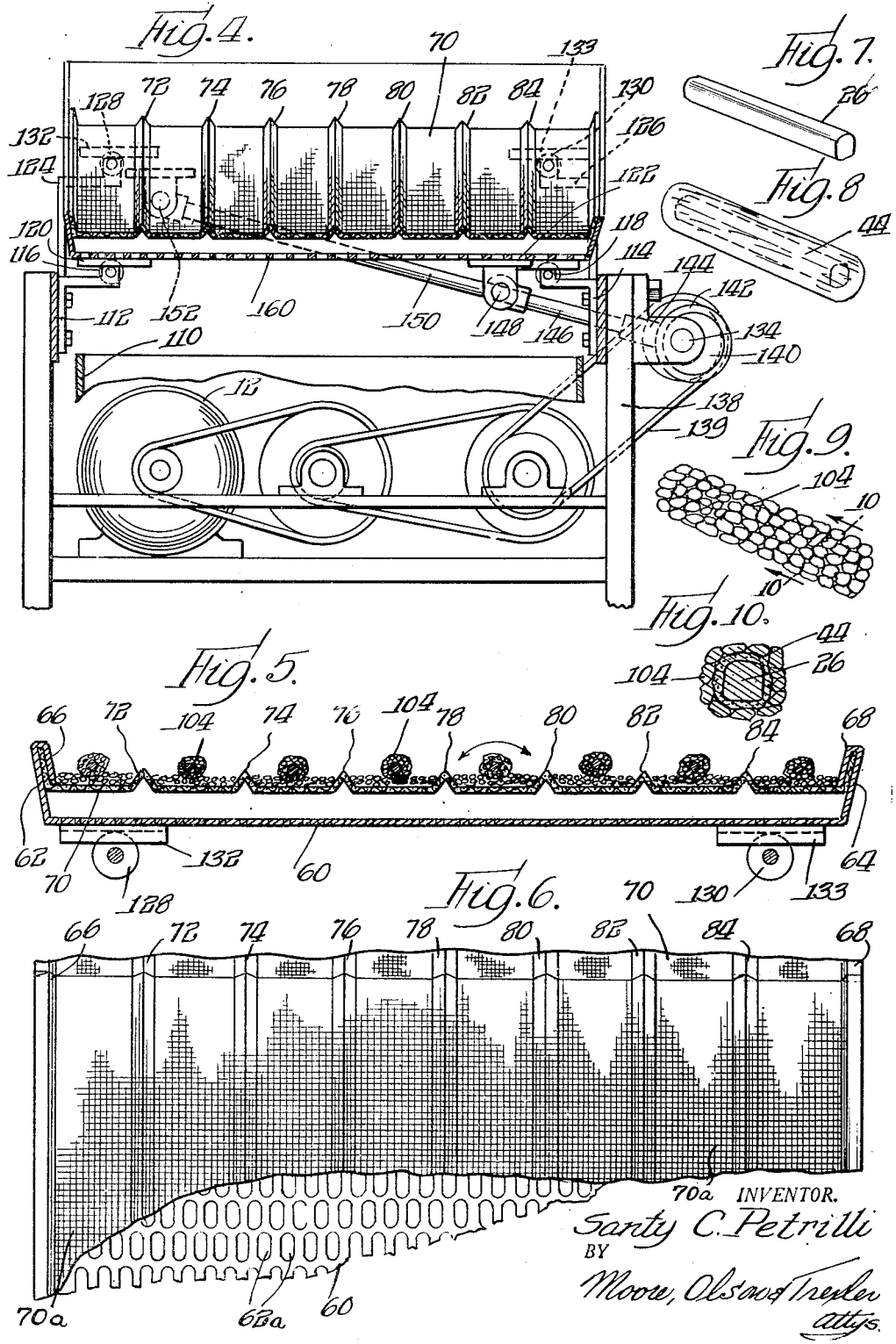

2,551,849

UNITED STATES PATENT OFFICE 2,551,849

APPARATUS FOR COATING CANDY BARS

Santy C. Petrilli, Chicago, Ill., assignor to General Candy Corporation, Chicago, Ill., a corporation of Illinois Application May 28, 1945, Serial No. 596,263

11 Claims. (Cl. 107—1)

The object of the present invention is to provide in association with an enrober mechanism and a source of supply of loose nuts, an inclined shaker conveyor adapted to receive partially nut covered and tacky coated candy bars coming from the enrober, the shaker conveyor being constructed and arranged to roll the candy bars upon a bed of nuts, in a direction transversely of the general downward inclination of the shaker conveyor, while at the same time progressing the bars forwardly and downwardly to a point of discharge.

Yet another object of the invention resides in providing a shaker conveyor of improved construction which is peculiarly adapted to embed loose peanuts into the tacky surface of a candy bar and at the same time impart the desired form to the coated candy bar and for delivering the thus coated candy bar to a predetermined point free of loose peanuts, dust, and the like.

Still another object is to provide in association with an enrober mechanism of well-known construction, and an endless belt feeding means for supplying the enrobed candy bars with a partial coating of loose peanuts, a compactly associated and actuated downwardly inclined shaker conveyor, together with mechanism for shaking the conveyor in a direction transversely of its downward inclination whereby a more compact arrangement of the various mechanisms may be secured and whereby candy bars embedded with peanuts and firmly rolled and rounded to shape may be delivered to a predetermined destination free of loose peanuts and the like; to provide these and other objects of invention as will be apparent from the perusal of the following specification when taken in connection with the accompanying drawings wherein:

Fig. 1 represents a side perspective view of improved shaker conveyor for coating candy bars with peanuts.

Fig. 2 is an enlarged sectional detailed view showing the arrangement of the shaker conveyor in association with part of the peanut feeding and the enrober mechanisms.

Fig. 3 is a sectional enlarged view of the means for maintaining the enrobed candy bars tacky prior to the feeding to the bed of peanuts.

Fig. 4 is a transverse sectional view taken on line 4 of Fig. 1.

Fig. 5 is a transverse sectional view taken on line 5 of Fig. 2.

Fig. 6 is a plan view of a part of the top surface of the shaker conveyor near the lower end thereof.

Fig. 7 is a perspective view of one of the candy bar cores.

Fig. 8 is a perspective view of one of the candy bar cores when it comes from the enrober.

Fig. 9 is a perspective view of one of the bars after it is covered with peanuts.

Fig. 10 is a sectional view on line 10—10 of Fig. 9.

Referring to the drawings in detail, the present invention relates to the same general subject matter as my prior Patent No. 2,347,164 patented April 18, 1944, and the drawings show a machine including a general framework 2, 4, 6, 8, and 10, and a motor 12 mounted upon a horizontal support 14. This motor constitutes the power source for driving the various belts and the various mechanisms. At the upper portion of the main support is provided a first endless belt 16 driven by a pulley 18 from driving mechanism 20 driven in any suitable way from the motor 12 or a separate motor. The upper reach 22 of this belt is in line with a feed mechanism 24 which is adapted to feed in spaced relation a series of candy bar cores 26 to the enrober 28. Thus these candy bar cores in spaced relation and disposed in multiple in a direction transversely across the belt 22 are fed into the enrober 28, passing under the usual single sealing flap 30 into the enrober chamber 32, where they are transferred on to the enrober belt 34. This comprises an endless belt passing around a series of pulleys 36 and 38 and the round guide 40 which is located at the front end of the enrober. The candy bars in maintained spaced relation thus are carried along by the upper reach of the belt 34 beneath the container 41 of the enrober which deposits as at 42 a coating of caramel preparation upon each candy bar as is well known in the art. The details of construction of the enrober construction per se are not new and therefore no further description is necessary. At the discharge end of the closed enrober, the sticky caramel bars 44 are discharged from the enrober chamber in a very viscous or sticky condition. They pass over a heated pipe 47 having a perforation 49 adapted to discharge steam 51 directly upon the candy bars as they are discharged from the end of the upper reach of the belt 34. This steam jet serves to maintain the caramel coating in a semi-liquid condition and prevents the bars from hardening prior to reaching the peanut bed hereinafter mentioned. The details of construction of the steam discharger are shown and claimed in my prior patent aforementioned.

The candy bars are discharged upon a second endless belt 46, which belt passes around a series of rollers 48, 50, and 52, which provide an upper horizontal reach 54 of the belt and a downwardly traveling inclined reach 56 of the belt. Means is provided for laying a coating of nuts upon the upper reach of the belt which comprises a hopper 58 containing nuts which are delivered in a shallow layer-like form or bed upon the upper reach 54 of the traveling endless conveyor belt. This bed of nuts is thus carried by the belt downwardly as shown in Fig. 2 and when the bed reaches the discharge end of the enrober conveyor, the sticky candy bars 44 will be deposited onto the bed of nuts as shown in Fig. 2. It will be borne in mind that a number of these candy bars are deposited at the same time onto the bed, in a direction transversely of the travel of the bed. As the sticky candy bars strike the bed, the loose nuts of the bed are impacted or embedded thereinto so that the candy bars then travel along until the belt passes over the pulley 52 at which time all of the candy bars and the loose nuts forming the bed are deposited downwardly on the upper end of a shaker conveyor now to be described. It will be appreciated that the candy bars pass downwardly through a shower of peanuts so that in fact all sides of the sticky candy bars are then coated with the loose nuts.

The shaker conveyor as shown in Figs. 2 and 4 is disposed directly underlying the discharge end of the belt 46. It comprises an elongated downwardly inclined trough or shaker surface which consists of an underlying pan or frame 60, the sides of which extend upwardly as at 62 and 64 and thence are bent overly as at 66 and 68. Attached to the downwardly depended flanges 66 and 68 and comprising an upper surface of the shaker conveyor is a wire mesh screen 70 of relatively heavy woven wire and of a size over the greater length to generally prevent the passage of whole nuts therethrough. This woven wire is provided with upstanding, bent ridges 72, 74, 76, 78, 80, 82, and 84, which extend parallel to the longitudinal axis of the shaker conveyor so as to provide between these ridges a series of elongated downwardly inclined pockets having flat bottoms formed of the wire mesh of relatively heavy gauge. At its rear upper end the pan is likewise provided with a flange 86 which forms a backing member. In addition, connected to a stationary part of the framework hereinbefore described is a downwardly inclined deflector 88 which fastens as at 90 to the stationary part of the machine. This deflector is positioned so as to receive any loose nuts that are showered down by the traveling belts 46 and deflect them downwardly on the shaker conveyor. The lower portion of the pan 60 is shown at 62a as being perforate, the perforations being large enough to pass the largest size of nuts therethrough and the wire mesh woven fabric 70 of the shaker conveyor at its bottommost portion 70a is given slightly less inclination than the upper portion so that as the candy bars approach the lower portion of the shaker conveyor, the downward inclination is not as marked as on the upper reaches of the shaker conveyor. The wire mesh screen and the pan terminate at the point 92 which directly overlies an additional endless belt 94 which passes around the pulleys 96, 98, 100, and over the guide pulley 102. The upper surface of this belt 94 itself is composed of sufficiently wide wire mesh so that peanuts may fall therethrough while the peanut embedded candy bars 104 are carried along thereby and are discharged as at 106 to an additional belt 108 to convey them to a desired destination. Below the belt 94 is located an additional hopper 110 which is adapted to receive the loose nuts and dust that fall through the perforated bottom tray 60 and through the meshes of the belt 94.

Means is provided for reciprocating the shaker conveyor in a direction transversely to its longitudinal downwardly inclined axis. This comprises two sets of brackets, 112 and 114, each of which supports a roller 116 and 118. In addition the pan member 60 of the shaker conveyor on its under side is provided with spaced horizontal tracks 120 and 122 at the rear end which is channelled to ride upon opposite sides of the two rollers 116 and 118. The rear part of the shaker conveyor is likewise provided with a second set of brackets 124 and 126 carrying rollers 128 and 130, which are adapted to underlie channel tracks 132 and 133 mounted on the inclined portion 62 of the pan member 60. The channel tracks 132 and 133 are similar to the channel tracks 120 and 122 of the lower part of the shaker conveyor. The means for imparting the reciprocating motion to the shaker conveyor to roll it backwardly and forwardly on its track comprises a plurality of cam members 134 and 136 on a support 138 carried in suitable bearings in the framework and driven by means of belts 139 from a series of pulleys and belts shown in Fig. 4, which are ultimately driven by the motor 12. These cams each carry an eccentric 140 and a surrounding yoke or strap 142 having a connection 144 with a rod 146 which in turn is preferably pivotally connected as at 148 to one of the front corners of the shaker conveyor. The opposite rod 150 which is connected to its own separate crank eccentric just like the rod 46 is pivotally connected as at 152 to the diagonally disposed upper portion of the shaker conveyor as indicated in Figs. 2 and 4. The travel of the two pitmans or rods 146 or 150 is identical and the radius of reciprocation is perferably slightly less than the distance between adjacent ridges 72 to 84 inclusive so that when a candy bar is deposited on a shaker conveyor, as the latter reciprocates, a candy bar will be rolled backwardly and forwardly between two adjacent ridges of the shaker conveyor whereby most effectively to impact and embed the loose nuts which are lying in loose formation on the upper service of the downwardly inclined shaker conveyor. In this manner the candy bars are rolled back and forth and move downwardly between the separate ridges in endless parallel paths until they reach the bottommost part of the shaker conveyor at which time they are discharged onto the underlying endless belt 94 and are thence carried to the next belt 108 for delivery to a destination. The nuts not passed through the mesh of the upper portion of the endless shaker conveyor are discharged through the openings in the lowermost part thereof 70a which is of wider mesh. These nuts will pass through and will thence pass through the underlying lower tray portion 62a and through the mesh of the belt 74 into the hopper 110.

It is understood, of course, that instead of using nuts as the articles to be embedded in the caramel coating, other edible materials may be used, and where the claims specify nuts, it is understood that this is broadly meant to indicate any desirable edible material which is capable of being embedding in the sticky coating of the candy bar.

Obviously the invention is not limited to the specific details of construction disclosed herein but is capable of other modifications and changes without departing from the spirit and scope of the appended claims.

Having thus described my invention, what I claim as new and desire to secure by Letters Patent is:

1. A shaker conveyor comprising an elongated downwardly inclined surface having a plurality of spaced apart substantially upstanding ridges disposed in parallel relation thereon in a direction parallel to the axis of downward inclination of the conveyor and means for reciprocating the conveyor in a direction transverse to the downward longitudinal axis of said conveyor surface, such transverse reciprocation being limited in extent to substantially the distance between said upstanding ridges.

2. A shaker conveyor comprising an elongated downwardly inclined surface having a plurality of spaced apart upstanding ridges disposed in parallel relation thereon in a direction parallel to the axis of downward inclination of the conveyor and means for reciprocating the conveyor in a direction transverse to the longitudinal axis of said upstanding ridges, the extent of lateral reciprocation being less than the distance between adjacent ridges.

3. In combination, a shaker conveyor comprising an elongated downwardly inclined surface having a plurality of spaced apart upstanding obstructions thereon disposed in a direction parallel with the longitudinal axis and parallel to the downward inclination of the surface, and means for reciprocating the shaker conveyor throughout its length in a direction normal to its longitudinal axis and for a distance somewhat less than the distance between adjacent upstanding obstructions, and means for feeding tacky caramel-coated candy bars and loose nuts onto the upper portion of said inclined surface so that upon reciprocation of said conveyor said loose nuts will be impacted and embedded in the tacky surface of said caramel coating, and said bars will be shaped and fed downwardly to the lower discharge end of said shaker conveyor.

4. In combination, an elongated downwardly inclined shaker conveyor, means for discharging nuts and tacky caramel-coated bars onto the upper portion of said shaker conveyor, the upper surface of said shaker conveyor being formed with spaced apart downwardly inclined parallel upwardly extending ridges, said ridges forming relatively wide spaces therebetween to receive the candy bars and nuts thereon and means for reciprocating said shaker conveyor such a predetermined amount in a direction transversely of the parallel ridges as to cause the candy bars and nuts generally to roll in the spaces between the ridges so that the candy bars lying between these ridges in general are rolled back and forth in the space between adjacent ridges and are passed downwardly of said shaker conveyor to the lower discharge end of said shaker conveyor and while being confined between a pair of adjacent ridges whereby and during which travel said nuts are embedded in said candy bars and said candy bars are efficiently shaped and formed.

5. In combination, an elongated support having a pair of spaced rollers adjacent the rear end of said support and a pair of spaced rollers adjacent the front end of said support, said first mentioned rollers being disposed at elevations above the second mentioned roller, an elongated shaker conveyor extending longitudinally of said support and in overlying relation thereto, said shaker conveyor having on its rear under side a pair of transverse channel-shaped tracks, each track adapted to overlie and straddle one of the rearmost rollers and having a pair of channel-shaped forwardly disposed spaced apart tracks, each of said forward tracks being adapted to overlie and straddle one of said forward rollers, and power actuated means for reciprocating said shaker conveyor on said rollers in a direction transversely of its longitudinal axis.

6. In combination, an elongated support having a pair of spaced rollers adjacent the rear end of said support and a pair of spaced rollers adjacent the front end of said support, said first mentioned rollers being disposed at elevations above the second mentioned roller, an elongated shaker conveyor extending longitudinally of said support and in overlying relation thereto, said shaker conveyor having on its rear under side a pair of transverse channel-shaped tracks, each track adapted to overlie and straddle one of the rearmost rollers and having a pair of channel-shaped forwardly disposed spaced apart tracks, each of said forward tracks being adapted to overlie and straddle one of said forward rollers, and power actuated means for reciprocating said shaker conveyor on said rollers, the upper surface of said shaker conveyor including a series of spaced apart parallel ridges extending parallel to the longitudinal axis of the shaker conveyor and said means for reciprocating said shaker conveyor being constructed and arranged to move the shaker conveyor a distance slightly less than the spacing between adjacent ridges.

7. In combination, an elongated support having a pair of spaced rollers adjacent the rear end of said support and a pair of spaced rollers adjacent the front end of said support, said first mentioned rollers being disposed at elevations above the second mentioned roller, an elongated shaker conveyor extending longitudinally of said support and in overlying relation thereto, said shaker conveyor having on its rear under side a pair of transverse channel-shaped tracks, each track adapted to overlie and straddle one of the rearmost rollers and having a pair of channel-shaped forwardly disposed spaced apart tracks, each of said forward tracks being adapted to overlie and straddle one of said forward rollers, and shaking means for reciprocating the shaker conveyor in a direction disposed at an angle to the longitudinal axis of the shaker conveyor, a distance slightly less than the distance between adjacent ridges.

8. In combination, an elongated support having a pair of spaced rollers adjacent the rear end of said support and a pair of spaced rollers adjacent the front end of said support, said first mentioned rollers being disposed at elevations above the second mentioned roller, an elongated shaker conveyor extending longitudinally of said support and in overlying relation thereto, said shaker conveyor having on its rear under side a pair of transverse channel-shaped tracks, each track adapted to overlie and straddle one of the rearmost rollers and having a pair of channel-shaped forwardly disposed spaced apart tracks, each of said forward tracks being adapted to overlie and straddle one of said forward rollers, and means for reciprocating the shaker conveyor in a direction disposed at an angle to the longitudinal axis of the shaker conveyor, said shaking means being connected to diagonally disposed front and back portions of the shaker conveyor.

9. In combination, an elongated support having a pair of spaced rollers adjacent the rear end of said support and a pair of spaced rollers adjacent the front end of said support, said first mentioned rollers being disposed at elevations above the second mentioned roller, an elongated shaker conveyor extending longitudinally of said support and in overlying relation thereto, said shaker conveyor having on its rear under side a pair of transverse tracks, each track adapted to overlie and rest upon one of the rearmost rollers and having a pair of forwardly disposed spaced apart tracks, each of said forward tracks being adapted to overlie and rest upon one of said forward rollers, the upper portion of said shaker conveyor being formed of wire mesh screen, the mesh of the greater length of said screen being insufficient to pass the nuts therethrough, said mesh at the lower portion of said screen being sufficiently larger mesh to pass the nuts therethrough, while retaining the nut-covered candy bars thereon.

10. In combination with a support, an elongated inclined shaker conveyor extending longitudinally of the support and adapted to receive tacky caramel-coated candy bars and loose nuts, said conveyor having spaced-apart substantially upstanding ridges disposed in parallel relation thereon and extending in a direction parallel to the axis of inclination of the conveyor, means for effecting limited reciprocation of said conveyor in a direction transverse to its longitudinal axis to an extent not greater than the distance between said ridges, the surface of said conveyor being formed of mesh screen of a mesh size over the greater length thereof generally insufficient to pass nuts therethrough, said screen at the lower portion thereof having a mesh size sufficiently larger to pass nuts therethrough while retaining the nut-covered candy bars thereon.

11. The combination with a support, an elongated shaker conveyor extending in a downwardly inclined direction throughout the extent thereof and longitudinally of said support, the bottommost portion of said conveyor being of less inclination to a horizontal plane than the upper portion thereof, said conveyor having an upper surface of wire mesh screen, the mesh throughout the greater length of the screen being generally insufficient to pass nuts therethrough and the mesh of the screen along the portion of less inclination being of sufficiently larger mesh size to pass nuts therethrough while retaining the nut-covered candy bars thereon, a plurality of spaced-apart ridges upstanding from said conveyor and disposed in parallel relationship thereon in a direction generally parallel to the axis of downward inclination of the conveyor, and means for effecting limited reciprocation of said conveyor transversely of its longitudinal axis to an extent less than the distance between adjacent ridges.

SANTY C. PETRILLI.

REFERENCES CITED

The following references are of record in the file of this patent:

UNITED STATES PATENTS

| Number | Name | Date |
|---|---|---|
| 708,255 | Prouty et al. | Sept. 2, 1902 |
| 791,243 | Carlson | May 30, 1905 |
| 1,025,290 | New | May 7, 1912 |
| 1,220,801 | Varga | Mar. 27, 1917 |
| 2,186,652 | Orth et al. | Jan. 9, 1940 |
| 2,300,396 | Bookidis | Nov. 3, 1942 |
| 2,324,246 | Thompson et al. | July 13, 1943 |
| 2,347,164 | Petrilli | Apr. 18, 1944 |

FOREIGN PATENTS

| Number | Country | Date |
|---|---|---|
| 16,041 | Great Britain | Nov. 6, 1888 |